United States Patent Office 3,296,246
Patented Jan. 3, 1967

3,296,246
DERIVATIVES OF ANTIBIOTICS HAVING A BASIC REACTION AND PROCESS FOR PREPARATION
Bernard Orës, Boulogne-sur-Seine, and Frédéric Zuckerkandl and Jean Philippe, Paris, France, assignors to Societe Anonyme dite: Societe Industrielle pour la Fabrication des Antibiotiques, Paris, France, a French company
No Drawing. Filed July 17, 1959, Ser. No. 827,682
Claims priority, application France, July 23, 1958, 770,893; May 29, 1959, 795,984
29 Claims. (Cl. 260—210)

The present invention relates to derivatives of antibiotics having a basic reaction, and a process for their preparation, the toxicity of which derivatives is considerably lower than that of the antibiotics from which they are derived.

The term, "basic antibiotic(s)," as used in the specification and claims of this application represents that group of antibiotics possessing highly basic primary and/or secondary amine moieties, such as for example a guanidine radical; further containing as a portion of the molecular structure an aminated sugar and/or aminocyclitol group and finally the antibiotics form simple salts with inorganic acids, said salts in aqueous solution having a pH which is neutral.

It is known that the basic antibiotics, such as streptomycin, dihydrostreptomycin, hydroxystreptomycin, neomycin, framycetin and kanamycin, which generally possess distinctly basic groups, such as guanidine groups and/or which are composed of aminated sugars or aminocyclitols, have a high antimicrobial activity and also possess a wide anti-bacterial spectrum, but that such antibiotics also have a marked toxicity.

This toxicity is manifested by certain of them, such as neomycin, on the eighth pair of cranial nerves and on the kidney, so that their parenteral use is excluded in therapeutic practice. As regards the others, such as dihydrostreptomycin, which can nevertheless be utilised by this method, it is necessary to observe certain precautions in the case of courses of treatment lasting a long time. The toxicity of these antibiotics can be shown experimentally in animals by establishing the lethal dose 50 percent ($LD_{50}$), which provides a measure of the acute toxicity; thus, each of the antibiotics mentioned above is characterised by an $LD_{50}$ expressed in milligrams of the active basic antibiotic per mouse of an average weight of 20 grams. The toxicity of these antibiotics can also be shown experimentally in animals by the administration of subtoxic doses of these products for more or less long periods of time, during which the variation in the weight of the animals undergoing the tests is observed and, at the end of which, the different organs of the animals are examined macroscopically and microscopically to detect the presence of any possible lesions.

It has, in consequence, long been desired to reduce the toxicity of these antibiotics by chemical modification; the resulting investigations have provided compounds which, even if they have proved less toxic, have lost some of the antimicrobic activity; this has happened particularly in the case of the N-acetylation of neomycin and the benzoylation of other basic antibiotics, the derivatives formed being completely inactive against bacteria.

On the other hand, the formation of salts of the basic antibiotics with acids such as pantothenic acid or ascorbic acid reduces their toxicity slightly. Nevertheless, such salt formation does not give sufficiently promising results to enable it to be applied to the most toxic basic antibiotics, such as neomycin.

The present invention has for its object to provide new derivatives of antibiotics having a basic reaction, which derivatives, while conserving the antimicrobial activity of the initial basic antibiotic, have a considerably reduced toxicity as compared with that of the said antibiotic; this difference is particularly apparent when the acute toxicities are determined in terms of $LD_{50}$ and the chronic toxicities are determined by the examination of weight curves and the organs.

The process for the preparation of the compounds according to the invention consists in bringing together, in a liquid medium, a basically reacting antibiotic having at least one free basic group and a salt of a hydroxyalkane sulphinic acid and/or of a hydroxyalkane sulphonic acid, and thereafter leaving the reactants in contact for at least one hour, the reaction being relatively slow, and finally, when the reaction is substantially complete, separating the resulting condensation product, for example by lyophilisation of the liquor or by precipitation with a solvent in which the product is insoluble.

The basic antibiotic which is used in carrying out the process comprises basic groups but it is not necessary that all these basic groups, particularly as regards the amine functions, should be free. In particular, certain amine functions can be neutralised, for example by acids and the process of the invention is still applicable because the remaining free amine functions react with the salts of the hydroxyalkane sulphinic and/or sulphonic acids to give condensation products which are derivatives of basic antibiotics, the toxicity of which derivatives is considerably lower than that of the antibiotics from which they are derived.

This is the case, for example, when using the commercial salt of kanamycin, constituted by the monosulphate of kanamycin in which sulphuric acid neutralises only two of the amine functions of the kanamycin, the other two amine functions remaining capable of reacting according to the process to give a detoxified derivative of kanamycin.

The antibiotic of basic reaction such as defined above and also designated below as the basic antibiotic can be isolated by suitable means which are already known, or be formed in situ by conventional processes, the starting material in such case most frequently being in the form of a salt such as a hydrochloride or sulphate.

Similarly, according to a modification of the process, the basic antibiotic can be replaced, in carrying out the process of the invention, by weak acid salts of the antibiotic, such as carbonates, which are capable of liberating the said base. The process then consists in bringing together in a liquid medium, the weak acid salt and a salt of a hydroxyalkane sulphinic acid and/or of a hydroxyalkane sulphonic acid, it being possible for the weak acid salt of the antibiotic to be formed in situ, by processes known per se, such as double decomposition reactions between the sulphates of the antibiotic and alkali metal or alkaline earth metal carbonates, and thereafter leaving the reactants in contact for at least one hour, the reaction being relatively slow, and finally, when the reaction is substantially complete, separating the resulting condensation product, for example by lyophilisation of the liquor or by precipitation with a solvent in which the product is insoluble.

The salts of the hydroxyalkane sulphinic and hydroxyalkane sulphonic acids employed are preferably such as have from 1 to 4 carbon atoms in the alkyl group. The salts can be replaced by a reactive mixture capable of forming them in situ, such for example as suitably prepared mixtures comprising formaldehyde and sodium bisulphite.

In one particular method of carrying out the process of the invention which is preferred in practice, the operation takes place in aqueous medium, the reaction mixture being left at ambient temperature while stirring for about 24 hours. The precipitation of the condensation product is effected with a solvent miscible with water, such as ethanol, methanol or acetone. This precipitation can be preceded by a treatment of the solution with active carbon and the adjustment of the pH to between 7 and 9, if it is desired to obtain a particularly pure product.

The process is particularly suitable for application to basic antibiotics which have amine functions, the condensation reaction in accordance with the invention then taking place on these functions to produce aminoalkane sulphoxylates and/or aminoalkane sulphonates of the basic antibiotic employed; analysis of these derivatives has shown that they conform to the following general formulae, in the case of the aminoalkane sulphoxylates:

$$R—NH—R'—SO_2M'$$

or $$(R—NH—R'—SO_2)_2M''$$

and in the case of the aminoalkane sulphonates:

$$R—NH—R'—SO_3M'$$

or $$(R—NH—R'—SO_3)_2M''$$

in which formulae R' is in alkyl radical, which may be substituted, M' is a monovalent metallic atom and M'' is a bivalent metallic atom, R—NH₂ representing the formula of the antibiotic in the basic state, in the eventuality that it has only a single amine function; if the molecule of this antibiotic has $p$ free amine functions, its formula can be written $R—(NH_2)_p$, and the derivatives obtained by the process of the invention conform to the general formulae:

$$R—(NH—R'—SO_2M')_p$$
$$(R)_2=[(NH—R'—SO_2)_2M'']_p \quad (1)$$

in the case of the aminoalkane sulphoxylates, and to the general formulae $$R—(NH—R'—SO_3M')_p$$
$$(R)_2=[(NH—R'—SO_3)_2M'']_p \quad (1)$$

in the case of the aminoalkane sulphonates. Thus there are as many hydroxyalkane sulphonic acid or hydroxyalkane sulphinic acid residues as there are free amine functions in the antibiotic employed; it is for this reason that in the case of neomycin, which can comprise up to 6 free amine functions, analysis shows that it is possible to obtain a detoxified derivative in which there are 6 residues of molecules of these acids in the final product; in the case of kanamycin, 4 residues can be found, while 3 residues can be found in the case of dihydrostreptomycin.

Included among the derivatives which are represented by the above general formulae are some which are obtained from basic antibiotics one or more of the amine functions of which are not free, being neutralised by such compounds as acids.

In this case the radical R comprises neutralised amine functions and can be written $R_1—(NH_2)_q$.

The present invention also comprises the use of a novel reaction which is performed on the substances of this structure and the result of which is to eliminate the metals M' and/or M'' and the group blocking the amine functions. The novel compounds obtained according to this process can be represented by the general formulae:

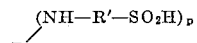

(2)

or

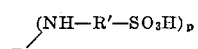

and also have a very much lower toxicity than the initial antibiotics.

In order to obtain the compounds of one of the Formulae 2, compounds of one of the Formulae 1, wherein R is of the form $R_1—(NH_2)_q$, are treated in a liquid medium with ion exchange resins which eliminate the metal atoms M' and/or M'' on the one hand and the groups blocking the amine functions of R on the other hand, while the new derivative of the antibiotic remains in solution and can be isolated.

To achieve this double elimination, it is also possible to resort to the action in liquid medium of a salt the cation of which gives insoluble compounds with the groups blocking the amine functions of R, which insoluble compounds are eliminated, and the anion of which combines with M' or M'' to give a salt which, after adding an appropriate solvent, remains in solution, while the new derivatives of the antibiotic is precipitated.

The method by which it is possible to obtain compounds of one of the general Formulae 1 relies on a condensation reaction of general character, which can be represented diagrammatically in the following manner in the case in which $p=1$ and the metal is monovalent and therefore indicated as M':

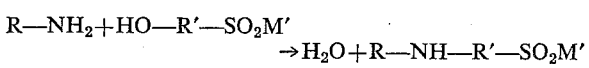

or

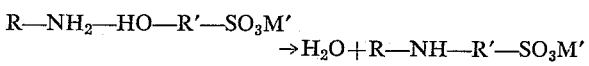

which condensation reaction can be carried out at ordinary temperature.

It is to be noted that salts of the basic antibiotics do not react with formaldehyde sulphoxylates or sulphonates to give the desired condensation products; instead the admixture of these reactants is accompanied by salification, according to a reaction of the type:

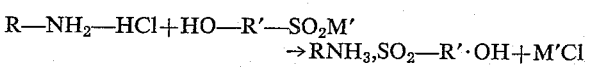

and for this reason leads to product of a toxicity equal to that of the antibiotics from which they are derived.

The process according to the invention is not applicable to one particular antibiotic of the class of basic antibiotics namely streptomycin. Condensation cannot be obtained between this compound and the hydroxyalkane sulphinic or sulphonic acids, probably because of the presence of a free aldehyde group in its molecule.

In carrying out the process, it is possible to calculate in advance the necessary proportions of the basic antibiotic and of the acids to be used.

With the object of further illustrating how the invention can be carried into effect examples of the preparation of compounds according to the invention will now be given. The weights indicated in the examples represent quantities of reactive principles calculated as anhydrous pure products, unless otherwise stated:

Example 1

To 616 g. of neomycin base (1 mole) dissolved in 6160 cc. of water are added 708 g. of sodium formaldehyde sulphoxylate (6 moles) which are condensed with the neomycin and more particularly with each of the six amine groups thereof. The mixture is subjected to constant stirring for 24 hours at ambient temperature. The solution is then decolorised with 50 g. of active carbon, and is then filtered and lyophilised. A white powder which is soluble in water and insoluble in methanol, ethanol and ether is obtained.

The product obtained is sodium neomycin hexamethane sulphinate and has the formula

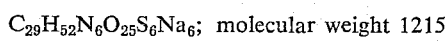; molecular weight 1215 percent of theoretical Na: 11.349; percent of Na found experimentally: 11.1; percent of theoretical S: 15.81; percent of S found experimentally: 15.9.

When titrated by the turbidimetric method relatively to a neomycin sulphate standard, its activity is 330 mcg. of base per mg.

The acute toxicity of the product has been determined by intravenous injection in albino mice weighing 20 grams, by comparison with that of neomycin sulphate and that of a mixture of "neomycin sulphate+sodium methane sulphinate" (in the proportions in which they respectively enter into the condensation product).

The injections were made at different concentrations but with a uniform volume of 0.5 ml.

The following results were obtained:

| Dose, mg./20 g. (expressed as base) | Mortality per 10 inoculated mice | | |
|---|---|---|---|
| | Sulphate | Mixture | Neomycin hexamethane sulphinate |
| 0.53 | 2/10 | | |
| 0.583 | 5/10 | 1/10 | |
| 0.641 | 7/10 | 4/10 | |
| 0.705 | 9/10 | 8/10 | |
| 0.775 | | 10/10 | |
| 21.5 | | | 1/10 |
| 27.5 | | | 3/10 |
| 30.0 | | | 5/10 |
| 36.0 | | | 9/10 |

The $LD_{50}$ expressed as mg. of base per kg. of live weight, and thus the limits of confidence of the $LD_{50}$ for a probability P=95% have been calculated by the Spearman-Karber method to give the following figures:

| Products | $LD^{50}$, mg./kg. | Limits of confidence, P= 95%, mg./kg. |
|---|---|---|
| Neomycin sulphate | 29.7 | 28.2–31.3 |
| Neomycin sulphate + sodium methane sulphinate | 32.6 | 31.3–34.1 |
| Sodium neomycin hexamethane sulphinate | 1,515 | 1,435–1,595 |

It is shown that the admixture of sodium methane sulphinate to neomycin sulphate leads to a very slight detoxification but that with the neomycin hexamethane sulphinate, the $LD_{50}$ is reduced by more than 50 times with respect to neomycin sulphate.

Chronic toxicity:

A first test carried out on groups of 10 albino rats by subcutaneous injection (six injections per week) at a rate of 75 mg. of base per kg. shows that neomycin sulphate, at the end of 4 weeks, caused serious and irreversible renal lesions with a death rate of three animals in ten; the same weight of base, administered in the form of sodium neomycin hexamethane sulphinate, caused discrete lesions which were reversible after the treatment ceased. No treated animal died. The difference between the nature of the lesions caused by the two products is very significant. The treatment was in addition continued with the indicated dose on three of the ten rats of the group with the detoxicated derivative of neomycin for another four weeks; no aggravation of the chronic nephrotoxicity was found.

Administered in subtoxic doses, for example equivalent to 30 mg. of neomycin base per kg. of animal and per day to a group of 15 rats for 13 weeks by subcutaneous injection, the sodium neomycin hexamethane sulphinate does not impede the growth of the treated animals, but on the contrary acts as a growth factor. Macroscopic and microscopic examination of the organs at the end of the experiment shows that the sodium neomycin hexamethane sulphinate only causes a discrete hypertrophy of the secretory cells of some tubes of the kidney, this remaining within the limit of physiological variations, while an equivalent dose of neomycin sulphate, administered to each of the 15 rats of another group, causes an acute epithelial nephritis. Furthermore, examination of the animals sacrificed four weeks after completing the treatment showed that the animals which had received neomycin sulphate had definite and large nephritic lesions, while the kidneys of the animals treated with sodium neomycin hexamethane sulphinate had become normal.

The antibacterial activity of sodium neomycin hexamethane sulphinate has been compared with that of neomycin sulphate.

(1) Procedure:

The activity on various bacteria is tested by the technique of a series of dilutions in nutrient broth.

The inoculum is a preculture in nutrient broth, incubated for 20 hours at 37° C. in static culture. After numeration of the culture by the MacCrady method, the preculture is diluted so that the number of bacteria in the test is $10^3$/ml.

The two substances are dissolved in sterile demineralised water.

The successive dilutions are carried out so as to be expressed as weight of salt (sulphate or hexamethane sulphinate) so that the relative activity of the two products on the different bacteria, can be evaluated.

(2) Results:

The following minimum inhibiting concentrations (M.I.C.) have been observed:

| Germs | Neomycin sulphate | Sodium neomycin hexamethane sulphinate |
|---|---|---|
| E. coli 8018 | 12.8 | 20 |
| E. coli 8001 | 34.5 | (¹) |
| Klebsiella pneumoniae 8034 | 4.8 | 8.5 |
| Klebsiella pneumoniae 8019 | 5.5 | 8.5 |
| Pasteurella multocide 8089 | 9 | 15 |
| | 15 | 20 |
| Proteus vulgaris 8079 | 34.5 | (approx.) 75 |
| Staphylococcus 8026 | 12.8 | 15 |

¹ No results, because there are inhibited tubes surrounded by growing tubes.

(3) Conclusions:

The antibacterial spectra of the two products are identical with the bacteria investigated. The activities are of the same order of magnitude if they are related to the same weight of base.

*Example 2*

72.5 g. of neomycin base, obtained by treatment of neomycin sulphate with barium carbonate, are dissolved in 720 cc. of water. To the solution thus formed is added 83.14 g. of sodium formaldehyde sulphoxylate. The mixture is stirred constantly for 20 hours at ambient temperature. The solution is then decolourised with 5 g. of active carbon, and the product is then precipitated with 5 volumes of methanol. The precipitate is dried in vacuo in an oven. It has the same characteristics as those mentioned in Example 1.

*Example 3*

15 g. of neomycin base obtained by passing neomycin sulphate over an anionic exchange resin are dissolved in 150 cc. of water. To the solution thus obtained is added 14.6 cc. of 30% formaldehyde and 15.18 g. of sodium bisulphite dissolved in 33 cc. of water. The mixture is stirred for 18 hours. It is then treated with 4 g. of active carbon and thereafter lyophilised.

The product obtained, the sodium neomycin hexamethane sulfonate, is a white powder, soluble in water, insoluble in methanol, ethanol and ether.

*Example 4*

6.5 g. of framycetin base obtained by treating framycetin sulphate with baryta are dissolved in 70 cc. of water. 7.45 g. of sodium formaldehyde sulphoxylate are added to the solution thus obtained. The mixture is kept for 20 hours at ambient temperature while stirring and is then treated with 4 g. of active carbon and thereafter lyophilised.

*Example 5*

25 g. of kanamycin monosulphate are treated with 8.3 g. of barium carbonate in 250 cc. of water. In this way there is obtained 20 g. of kanamycin base in solution. To this solution is added 19.5 g. of sodium formaldehyde sulphoxylate. The mixture is kept for 18 hours at ambient temperature while stirring. The solution is then treated with 8 g. of active carbon and thereafter 5 volumes of methanol are added. The centrifuged precipitate is oven-dried in vacuo. The product obtained is sodium kanamycin tetramethane sulphinate corresponding to the formula $$C_{22}H_{40}N_4O_{19}S_4Na_4: \text{ molecular weight}=884.5$$

The specific rotation of the product obtained according to this example when in 1% aqueous solution is:

$$(\alpha)_D^{20}=80°$$

The infra-red spectrum of this product presents absorption bands at the following wavelengths, expressed in cm.$^{-1}$: 3330, 1630, 1045 and 950.

The acute toxicity of the product was determined by intravenous injection to albino mice weighing 20 grams and compared with that of kanamycin sulphate and that of a mixture of "kanamycin sulphate+sodium methane sulphinate" (in the proportions in which they are respectively present in the condensation product).

The injections were made at different concentrations with a uniform volume of 0.5 ml.

The results obtained were as follows:

| Dose, mg./20 g. (expressed as base) | Mortality per 10 inoculated mice | | |
|---|---|---|---|
| | Sulphate | Mixture | Sodium kanamycin tetramethane sulphinate |
| 4.75 | 0/10 | 0/10 | |
| 5.42 | | 6/10 | |
| 5.97 | 2/10 | 8/10 | |
| 6.64 | 3/10 | 8/10 | |
| 7.30 | 6/10 | | |
| 8.07 | 9/10 | 10/10 | |
| 23.70 | | 10/10 | |
| 30.00 | | | 1/10 |
| 33.00 | | | 1/10 |
| 36.00 | | | 3/10 |
| 39.00 | | | 5/10 |
| 49.00 | | | 9/10 |

The LD$_{50}$ expressed as mg. of base per kg. of live weight, as well as the limits of confidence of the LD$_{50}$ for a probability P=95% were calculated by the Spearman-Karber method giving the following results:

| Product | LD$^{50}$, mg./kg. | limits of confidence, P=95%, mg./kg. |
|---|---|---|
| Kanamycin sulphate | 348 | 333.5–367 |
| Kanamycin sulphate + sodium methane sulphinate | 282.3 | 264–295.5 |
| Sodium kanamycin tetramethane sulphinate | 1,887.5 | 1796.5–1984 |

It is found that the addition of sodium methane sulphinate to kanamycin sulphate leads to a slight improvement in the toxicity. On the other hand, sodium kanamycin tetramethane sulphinate has an LD$_{50}$ five times higher, e.g., that the acute toxicity is five times weaker than that of kanamycin sulphate.

The product, administered subcutaneously to a group of 15 rats for 14 weeks with a dose of 400 mg./kg. (expressed as base) and per day has no unfavourable effect on the growth of the animals being investigated, but on the contrary is shown to be a growth factor.

On anatomopathological examination at the end of the experiment, the 15 comparison animals treated with an equivalent dose of kanamycin sulphate show acute epithelial nephritis with dilation of the tubes or, on the contrary, involution and sclerosis of the same tubes and annular sclerosis around the glomerules. The interstitial and glomerular lesions are irreversible.

The animals treated with sodium kanamycin tetramethane sulphinate show dilation of the distorted tubes without lesion of the epithelium, interstitial tissue and glomerules. These modifications, extremely discrete, are reversible.

The antibacterial activity of sodium kanamycin tetramethane sulphinate was compared with that of kanamycin sulphate.

The determination of the minimum inhibiting concentration (M.I.C.) of the two products was carried out by the method of series dilutions in nutrient broth; the test was carried out on 18 different bacteria.

The inoculum is obtained from a preculture in nutrient broth, incubated for 20 hours at 37° C. in static culture. The number of bacteria in each preculture is calculated by the MacCrady method and brought to 10$^3$/ml.

The solutions are made in sterile demineralised water.

Kanamycin sulphate; sodium kanamycin tetramethane sulphinate (titrating 510 mcg./mg.); results (expressed in mcg./ml.).

| Germs | M.I.C. | |
|---|---|---|
| | Kanamycin sulphate | Sodium kanamycin tetramethane sulphinate |
| *Escherichia coli* 8018 | 25 | 25 |
| *Escherichia coli* 8001 | 25 | 25 |
| *Escherichia coli* 8098 | 12.8 | 25 |
| *Klebsiella pneumoniae* 8019 | 3.2 | 3.2 |
| *Klebsiella pneumoniae* 8022 | 3.2 | 3.2 |
| *Klebsiella pneumoniae* 8034 | 1.6 | 1.6 |
| *Proteus vulgaris* 8079 | 12.8 | 25 |
| *Proteus vulgaris* 8138 | 25 | 25 |
| *Salmonella pullorum* 8091 | 12.8 | 6.4 |
| *Salmonella gallinarum* 8092 | 3.2 | 3.2 |
| *Pasteurella multocida* 8089 | 6.4 | 3.2 |
| *Pseudomonas aeruginosa* 8003 | 100 | 100 |
| *Pseudomonas aeruginosa* 8004 | 100 | 100 |
| *Pseudomonas aeruginosa* 8101 | 25 | 25 |
| Staphylococcus 8026 | 6.4 | 6.4 |
| *Staphylococcus aureus* 8140 | 6.4 | 6.4 |
| Enterococcus 8085 | 12.8 | 12.8 |
| *Bacillus subtilis* 8035 | 6.4 | 12.8 |

On equal amount of base, the M.I.C. values obtained with the two products are identical for 14 bacteria. The variations on 4 bacteria are never higher than 2 (base of the progression) and consequently cannot be regarded as significant.

*Example 6*

18.3 g. of dihydrostreptomycin base obtained by treating dihydrostreptomycin sulphate with barium carbonate are dissolved in 100 cc. of water. To the solution thus formed is added 11.7 g. of sodium formaldehyde sulphoxylate. The mixture is kept for 20 hours at ambient temperature while stirring. The solution is then treated with 5.5 g. of active carbon and the condensation product is then precipitated with 5 volumes of methanol. The centrifuged precipitate is oven-dried in vacuo.

The product obtained is sodium dihydrostreptomycin trimethane sulphinate and conforms to the formula:

$$C_{24}H_{44}N_7O_{18}S_3Na_3 \text{—molecular weight } 884$$

Study of the antibacterial spectrum of this new derivative, carried out by comparison with dihydrostreptomycin sulphate on 20 very different microbial strains, led to the conclusion that the action of the two compounds as regards the bacteria studied was identical, and also showed that the antimicrobial activity was maintained.

When testing the protection of the infected animal, effected by inoculation to mice of two bacteria (*Klebsiella* pneumoniae and Escherichia coli) the sodium dihydro-streptomycin trimethane sulphinate showed the same protecting action as that of dihydrostreptomycin sulphate.

Study of the acute toxicity was undertaken in mice and guinea pigs. It is particularly the experiment carried out on mice by intravenous injection which showed the surprising detoxication effect, because the comparison was carried out with dihydrostreptomycin sulphate and with a mixture of dihydrostreptomycin sulphate and sodium methylene sulphoxylate in the proportions in which they respectively are present in the condensation product.

The injections were made with different concentrations but a uniform volume of 0.5 ml.

The results were as follows:

| Dose, mg./20 g. (expressed as base) | Mortality per 10 inoculated mice | | |
|---|---|---|---|
| | Sulphate of dihydrostreptomycin | Mixture | Sodium dihydrostreptomycin trimethane sulphinate |
| 2.75 | 1/10 | | |
| 3.00 | 4/10 | 1/10 | |
| 3.30 | 7/10 | 4/10 | |
| 3.60 | 9/10 | 7/10 | |
| 3.90 | | 10/10 | |
| 13.60 | | | 3/10 |
| 15.00 | | | 4/10 |
| 16.50 | | | 7/10 |
| 18.10 | | | 9/10 |

The $LD_{50}$ expressed as mg. of base per kg. of weight, as well as the limits of confidence of the $LD_{50}$ for a probability $P=95\%$ were calculated by the Spearman-Karber method, giving the following results:

| Substances | $LD^{50}$, mg./kg. | Limits of confidence, $P=95\%$, mg./kg. |
|---|---|---|
| Dihydrostreptomycin sulphate | 154 | 148–163 |
| Dihydrostreptomycin sulphate + sodium methylenesulphoxylate | 170.5 | 155–177.5 |
| Sodium dihydrostreptomycin trimethane sulphinate | 765 | 725–805.5 |

It is seen that the $LD_{50}$ of the mixture does not significantly differ from that of dihydrostreptomycin sulphate; the toxicity ratio is here:

$$R = \frac{\text{Sodium dihydrostreptomycin trimethane sulphinate}}{\text{Dihydrostreptomycin sulphate}} = 4.96$$

By subcutaneous injection, the $LD_{50}$ obtained on 3 groups of 90 mice have the following values:
  (a) Dihydrostreptomycin sulphate: 1487.5 mg./kg.
  (b) Mixture of dihydrostreptomycin sulphate and sodium methylene sulphoxylate: 1524 mg./kg.
  (c) Sodium dihydrostreptomycin trimethane sulphinate: 3380.5 mg./kg.

The condensation product administered subcutaneously to a group of 15 rats for 13 weeks with a dose of 600 mg./kg. (expressed as base) and per day did not have any unfavourable effect on the growth of the animals, but on the contrary resulted in a more rapid increase in weight than that observed in comparison animals not receiving any treatment.

On anatomopathological examination at the end of the experiment, the 15 comparison animals treated with an equivalent dose of dihydrostreptomycin sulphate have discrete renal lesions and benign interstitial infiltrates.

The animals treated with sodium dihydrostreptomycin trimethane sulphinate show a complete glomerulo-epithelial integrity. On the pharmacological plane, the sodium dihydrostreptomycin trimethane sulphinate causes cardiovascular, muscular and respiratory reactions 2 to 5 times less marked than an equal dose of dihydrostreptomycin sulphate.

*Example 7*

34 g. of dihydrostreptomycin sulphate are weighed out and diluted in 70 cc. of demineralised water. 13.7 g. of barium carbonate are added to the solution. The mixture is stirred for 3–4 hours and then the solution is filtered. To the clear filtrate is added 38.5 cc. of a solution of sodium bisulphite (28° Baumé) followed by 4.65 cc. of a 30% formaldehyde solution. The mixture is kept for 20 hours while stirring at ambient temperature. The solution is then treated with 1.2 g. of active carbon and thereafter precipitation is brought about with 6 volumes of methanol. The centrifuged precipitate is oven-dried in vacuo. The product obtained is sodium dihydrostreptomycin trimethane sulphonate, with the formula: $C_{24}H_{44}N_7O_{21}S_3Na_3$, molecular weight: 932.

*Example 8*

20 g. of kanamycin monosulphate are dissolved in 150 cc. of water. 6.7 g. of barium carbonate are added to the solution. Stirring is carried out for 4 hours and then the precipitate which is formed is filtered out. To the clear filtrate is added 43.8 cc. of a sodium bisulphite solution (28° Baumé), followed by 12.3 cc. of a 30% formaldehyde solution. After the reaction, solution is treated with 1 g. of active carbon and precipitation is then effected with 6 volumes of methanol. The centrifuged precipitate is oven-dried in vacuo.

The product obtained is sodium kanamycin tetramethane sulphonate and conforms to the formula: $C_{22}H_{40}N_4O_{23}S_4Na_4$—molecular weight: 948.5. The infrared spectrum of the product has absorption bands at the following wavelengths, expressed in $cm.^{-1}$: 3330, 1630, 1185, 1045.

*Example 9*

50 g. of kanamycin monosulphate are dissolved in 400 cc. of demineralised water. To this solution is added while stirring 20.3 g. of sodium formaldehyde sulphoxylate (expressed as pure anhydrous product) and 2 g. of active carbon. The reaction mixture is left while stirring for 8 hours. It is then filtered to remove the carbon and thereafter the monosulphate of sodium kanamycin N-N'-dimethane sulphinate formed as precipitated by addition of 5 volumes of methanol to the solution. The white precipitate thus obtained is washed, centrifuged and oven-dried in vacuo.

The specific rotation of the product obtained is in 1% aqueous solution $$(\alpha)_D^{20} = 90°$$

The infra-red spectrum of the product has absorption bands at the following wavelengths, expressed as $cm.^{-1}$: 3330, 1630, 1515, 1115, 1040, 950.

*Example 10*

58.1 g. of kanamycin monosulphate are diluted in 400 cc. of demineralised water. To the solution is added a mixture formed by mixing 67.9 cc. of sodium bisulphite solution (28° Baumé) and 20 cc. of 30% formaldehyde solution. The mixture is stirred for 10 hours at ambient temperature while protected from light. 2 g. of active carbon are then added. The pH value is adjusted to 7.5 and then the mixture is filtered. The clear solution is lyophilised. The product obtained is the monosulphate of sodium kanamycin N-N'-dimethane sulphonate and is in the form of white powder soluble in water and insoluble in methanol, ether and ethanol.

*Example 11*

50 g. of kanamycin monosulphate are diluted in 480 cc. of demineralised water. To this solution is added, while stirring, 20.3 g. of sodium formaldehyde sulphoxylate (expressed as pure anhydrous product). The solution is left at ambient temperature for 10 hours while stirring and while protected from light. At the end of this time, the solution is passed through a column containing an intimate admixture of the "Amberlite" ion-exchange resins designated as IR.45 (300 cc.) and IR.120 (150 cc.). The rate of flow is regulated so that the pH of the effluent is in the region of 7.5. The solution obtained contains the new detoxicated derivative, the structure of which is of the type (2) and which is a derivative of kanamycin dimethane sulphinic acid; it is treated with active carbon and then lyophilised.

The infra-red spectrum of the product has absorption bands at the following wavelengths, expressed as cm.$^{-1}$: 3330, 1630, 1515, 1145, 1040, 950.

*Example 12*

146 g. of kanamycin monosulphate are dissolved in 1000 cc. of demineralised water. To the solution is added, while stirring, 59 g. of sodium formaldehyde sulphoxylate (expressed as pure anhydrous product). The mixture is stirred for 12 hours at ambient temperature while protected from light. At the end of this time 68.7 g. of barium acetate (with 1 molecule of water) are added to the solution. The mixture is stirred for 3–5 hours and the barium sulphate which has formed is then filtered out. The solution is treated with 4 g. of active carbon, the carbon is then removed and thereafter the derivative of kanamycin dimethane sulphinic acid is precipitated with methanol, in which the sodium acetate remains in solution. The specific rotation of the product obtained is, in 1% aqueous solution:

$$(\alpha)_D^{20} = 109°$$

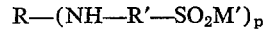

*Example 13*

58.1 g. of kanamycin monosulphate are diluted in 450 cc. of demineralised water. To this solution is added 67.9 cc. of sodium bisulphite solution (28° Baumé) and 20 cc. of 30% formaldehyde solution. The mixture is stirred for 12 hours at ambient temperature while protected from light. The solution is then passed through a column containing an intimate mixture of the ion-exchange resins known as "Amberlite" IR.45 (400 cc.) and IR.120 (200 cc.). The rate of flow is so regulated that the pH of the effluent is in the region of 7.5. The effluent contains the derivative of kanamycin dimethane sulphonic acid and is first treated with active carbon (2.5 g.) and then with 5 volumes of methanol to effect precipitation.

The infra-red spectrum of the product has absorption bands at the following wavelengths, expressed as cm.$^{-1}$: 3330, 1630, 1505, 1040.

*Example 14*

58.1 g. of kanamycin monosulphate are diluted in 400 cc. of demineralised water. To the solution is added a mixture formed by mixing 67.9 cc. of sodium bisulphite solution (28° Baumé) and 20 cc. of 30% formaldehyde solution. The mixture is stirred for 10 hours at ambient temperature while protected from light. To the solution is then added 27.3 g. of barium acetate (with 1 molecule of water). The mixture is stirred for 3–4 hours and then the precipitated barium sulphate is eliminated by filtration. The clear filtrate is treated with 5 volumes of methanol; the kanamycin dimethane sulphonic acid derivative precipitates. The white precipitate is centrifuged, washed with a small quantity of methanol and oven-dried in vacuo.

The specific rotation of the product obtained, in 1% aqueous solution, is:

$$(\alpha)_D^{20} = 105°$$

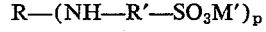

*Example 15*

20 g. of kanamycin monosulphate are diluted in 125 cc. of demineralised water and to this solution is added 10.5 g. of sodium formaldehyde bisulphite. The reaction mixture is left while stirring for 10 hours. 500 mg. of active carbon are then added, the mixture then being left while stirring for 1 hour and finally filtered. The pH value of the solution is adjusted to 7.3 and then precipitation is effected with 4 volumes of methanol. The product obtained is the monosulphate of sodium kanamycin dimethane sulphonate, which is washed, centrifuged and oven-dried in vacuo.

We claim:
1. A process for the preparation of new derivatives of basic antibiotics, having a moiety selected from the group consisting of primary amine, secondary amine, and both primary and secondary amine and further having a moiety selected from the group consisting of an aminated sugar, an aminocyclitol and both aminated sugar and aminocyclitol, which comprises reacting said basic antibiotic having at least one free basic group with a salt of an acid selected from the class consisting of hydroxyalkane sulphinic acids and hydroxyalkane sulphonic acids in a liquid medium until the reaction is substantially complete and thereafter separating the resulting condensation product from the reaction medium, said basic antibiotic being one which will react with said salt to form a condensation product of reduced toxicity.

2. A process as claimed in claim 1, in which said condensation product is separated by means comprising lyophilisation.

3. A process as claimed in claim 1, in which said condensation product is separated by means comprising precipitation by the addition to the reaction medium of a solvent in which the condensation product is insoluble.

4. A process as claimed in claim 1, in which said basic antibiotic is one having at least one free amine function.

5. A process as claimed in claim 1, in which the antibiotic employed is one in which the basic groups are neutralised and at least one free basic group thereof is liberated in situ in the reaction medium.

6. A process as claimed in claim 1, in which said basic antibiotic is employed in the form of a weak acid salt thereof.

7. A process as claimed in claim 6, in which said weak acid salt is a carbonate.

8. A process as claimed in claim 1, in which the said salt is formed in situ.

9. A process as claimed in claim 8, in which the said salt is formed in situ by incorporating in the reaction medium an aldehyde and sodium bisulphite.

10. A process as claimed in claim 1, in which the reaction takes place at a temperature between 15 and 45° C. in an agitated aqueous medium for about 24 hours and the condensation product is separated by means comprising the addition to the reaction medium of a solvent in which the condensation product is insoluble.

11. A process as claimed in claim 1, in which said basic antibiotic is one having at least one free amine function and at least one neutralised amine function and the resulting condensation product, after separation from the reaction medium, is so treated as to eliminate the metal atoms and the groups neutralising said at least one neutralised amine function.

12. A process as claimed in claim 11, in which the elimination is effected by passage over at least one ion exchange resin.

13. Antibiotic derivatives of the general formula $$R—(NH—R'—SO_2M')_p$$

in which R represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of $p$ free amine functions, R' is an alkyl radical having from 1 to 4 carbon atoms and M' is a monovalent metal.

14. Antibiotic derivatives of the general formula $$R—(NH—R'—SO_3M')_p$$

in which R represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of its $p$ free amine functions, R' is an alkyl radical having from 1 to 4 carbon atoms and M' is a monovalent metal.

15. Antibiotic derivatives of the general formula $$(R)_2 = [(NH-R'-SO_2)_2M'']_p$$

in which R represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of its $p$ free amine functions, R' is an alkyl radical having from 1 to 4 carbon atoms and M'' is a bivalent metal.

16. Antibiotic derivatives of the general formula $$(R)_2 = [(NH-R'-SO_3)_2M'']_p$$

in which R represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of its $p$ free amine functions, R' is an alkyl radical having from 1 to 4 carbon atoms and M'' is a bivalent metal.

17. Antibiotic derivatives of the general formula

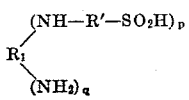

in which $R_1$—$(NH_2)_q$ represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of $p$ of a total of $p+q$ amine functions and R' is an alkyl radical having from 1 to 4 carbon atoms.

18. Antibiotic derivatives of the general formula

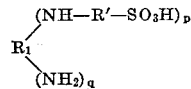

in which $R_1$—$(NH_2)_q$ represents a basic antibiotic, having a moiety selected from the group consisting of primary amine, secondary amine and both primary and secondary amine and further having a moiety selected from the group consisting of an aminated sugar, an aminocyclitol and both aminated sugar and aminocyclitol, deprived of $p$ of a total of $p+q$ amine functions and R' is an alkyl radical having from 1 to 4 carbon atoms.

19. Sodium neomycin hexamethane sulphinate.
20. Sodium kanamycin tetramethane sulphinate.
21. Sodium dihydrostreptomycin trimethane sulphinate.
22. Sodium neomycin hexamethane sulphonate.
23. Sodium dihydrostreptomycin trimethane sulphonate.
24. Sodium kanamycin tetramethane sulphonate.
25. Monosulphate of sodium kanamycin dimethane sulphinate.
26. Monosulphate of sodium kanamycin dimethane sulphonate.
27. Kanamycin dimethane sulphinic acid.
28. Kanamycin dimethane sulphonic acid.
29. N-methane sulfonates of kanamycin.

References Cited by the Examiner

FOREIGN PATENTS 552,562   2/1958   Canada.

OTHER REFERENCES

Nature 181: March 8, 1958, pp. 706–7.
Umezawa et al.: Jour. of Antibiotics, Ser. A, Japan, vol. XII, No. 3, pp. 114–5, May 1959.

LEWIS GOTTS, *Primary Examiner*.

ABRAHAM H. WINKELSTEIN, *Examiner*.

A. L. MONACELL, J. R. BROWN, *Assistant Examiners*